US008121228B2

(12) United States Patent
Gorday (10) Patent No.: US 8,121,228 B2
(45) Date of Patent: Feb. 21, 2012

(54) DETECTING A DATA FRAME (75) Inventor: Robert M. Gorday, W. Palm Beach, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 1722 days.

(21) Appl. No.: 11/267,537

(22) Filed: Nov. 4, 2005

(65) Prior Publication Data

US 2007/0104297 A1    May 10, 2007

(51) Int. Cl.
H04B 1/00        (2006.01)
H04L 27/06     (2006.01)

(52) U.S. Cl. ........ 375/343; 375/142; 375/147; 375/148; 375/149; 375/150; 375/340; 375/342

(58) Field of Classification Search .................. 375/260, 375/340, 147–150, 342, 343, 350, 365, 142; 370/335, 342
See application file for complete search history.

(56) References Cited

U.S. PATENT DOCUMENTS

| 5,598,444 | A | * | 1/1997 | Lim | 375/368 |
| 5,894,494 | A | * | 4/1999 | Davidovici | 375/150 |
| 6,147,982 | A | * | 11/2000 | Sourour et al. | 370/324 |
| 6,272,194 | B1 | * | 8/2001 | Sakamoto | 375/368 |
| 6,404,831 | B1 | * | 6/2002 | Melas | 375/350 |
| 6,636,557 | B2 | * | 10/2003 | Imaizumi et al. | 375/147 |
| 6,882,682 | B1 | * | 4/2005 | Tanaka | 375/150 |
| 7,039,134 | B1 | * | 5/2006 | Avital et al. | 375/343 |
| 2001/0002919 | A1 | * | 6/2001 | Sourour et al. | 375/150 |
| 2002/0064217 | A1 | * | 5/2002 | Ohsuge | 375/152 |
| 2003/0156672 | A1 | * | 8/2003 | O'Shea et al. | 375/365 |
| 2003/0179839 | A1 | * | 9/2003 | Astrachan | 375/343 |
| 2004/0052319 | A1 | * | 3/2004 | Wakamatsu | 375/343 |
| 2005/0185743 | A1 | * | 8/2005 | Li | 375/350 |
| 2006/0067384 | A1 | * | 3/2006 | Zhang et al. | 375/148 |

* cited by examiner

Primary Examiner — Khanh C Tran
Assistant Examiner — Eboni Hughes (57) ABSTRACT

A detector (109) and corresponding method is configured for detecting presence of a data frame. The detector includes a first correlator (123) that is configured to provide a first plurality of correlations corresponding to similarity between data as received and first information, e.g., an ordered set of coefficients, that denotes the data frame and a second correlator (125) that is configured to provide a second plurality of correlations corresponding to similarity between the data as received and second information, e.g., another ordered set of coefficients, that denotes the data frame, where the second information includes a portion of the first information. Further included is decision logic (129) coupled to the first correlator and the second correlator, where the decision logic is configured to provide an indication (111) that the data frame is present based on the first plurality of correlations and the second plurality of correlations.

21 Claims, 9 Drawing Sheets

DETECTING A DATA FRAME

FIELD OF THE INVENTION

This invention relates in general to communication receivers and more specifically to methods and apparatus for detecting whether a data frame is present in received data.

BACKGROUND OF THE INVENTION

In many receivers that are configured to operate in present systems, the receiver must be arranged to determine when a signal of interest is present. One technique that is used in many system or system protocols in order to facilitate this determination is the transmission of known data that a receiver can hunt for and when found decide that data is present. The known data may be provided as a preamble in a data frame. When the preamble is "found", it is presumed that a data frame is available. Conventional receivers normally correlate received data with known data and when received data is found that correlates well with the known data, a detect is declared. Known systems are subject to errors both positive and negative, i.e., declaring a detect when the received data in fact did not include the known data and not declaring a detect when the known data in fact was present. While safeguards in terms of other processing are normally used to mitigate these errors, such safeguards may consume processing capacity or result in lower system capacities due to unnecessary repeated transmissions.

Other factors in receivers, such as offset correction and gain control exacerbate the problems of making accurate determinations of whether known data is available. For example, during early portions of received data the systems that are correcting for any offset (typically referred to as DC offset) and establishing appropriate signal levels by setting various receivers gains, can corrupt the received data in one or more manners, thereby contributing to errors in the detection process.

The duration of the known data can be increased and an improvement in detect accuracy could be realized, however this is not a popular choice since the known data is overhead and increases in overhead may result in lower system capacity.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communications receivers and systems that can be used to provide service to users thereof. More particularly various inventive concepts and principles embodied in receivers as detection apparatus and methods for detecting the presence of a signal or data frame, where the apparatus and methods are arranged for improved accuracy and fast response times are discussed and described. The receivers and thus detectors of particular interest are those being developed and deployed where an accurate and reasonably fast response time for data presence detection systems may be required, such as systems using frequency hopped, TDMA (time division multiple access) CDMA (code division multiple access) based or other air interface protocols with packetized data or the like that can contribute to detection errors. Note that the concepts and principles according to the present invention, while described in the context of a receiver or system suitable for operation in the Family Radio Service (FRS) or Industrial, Scientific, and Medical (ISM) frequency bands, are believed to be applicable in many systems in the communication field. More particularly much of the discussion below will be in the context of an air interface protocol according to an IEEE 802.15.4 standard, although it will be clear that the concepts and principles apply to may air interface protocols where an accurate determination of the presence of a data frame can be utilized.

As further discussed below various inventive principles and combinations thereof are advantageously employed to provide a first set of correlations between data as received and first information plus a second set of correlations between data as received and second information that overlaps in part with the first information and then providing an indication of whether the data includes a data frame based on both sets of correlations. This inventive detector system and techniques can be particularly advantageously utilized within an exemplary CDMA receiver, thereby alleviating various problems associated with known detectors and facilitating lower cost higher performance receivers, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Figure 1:
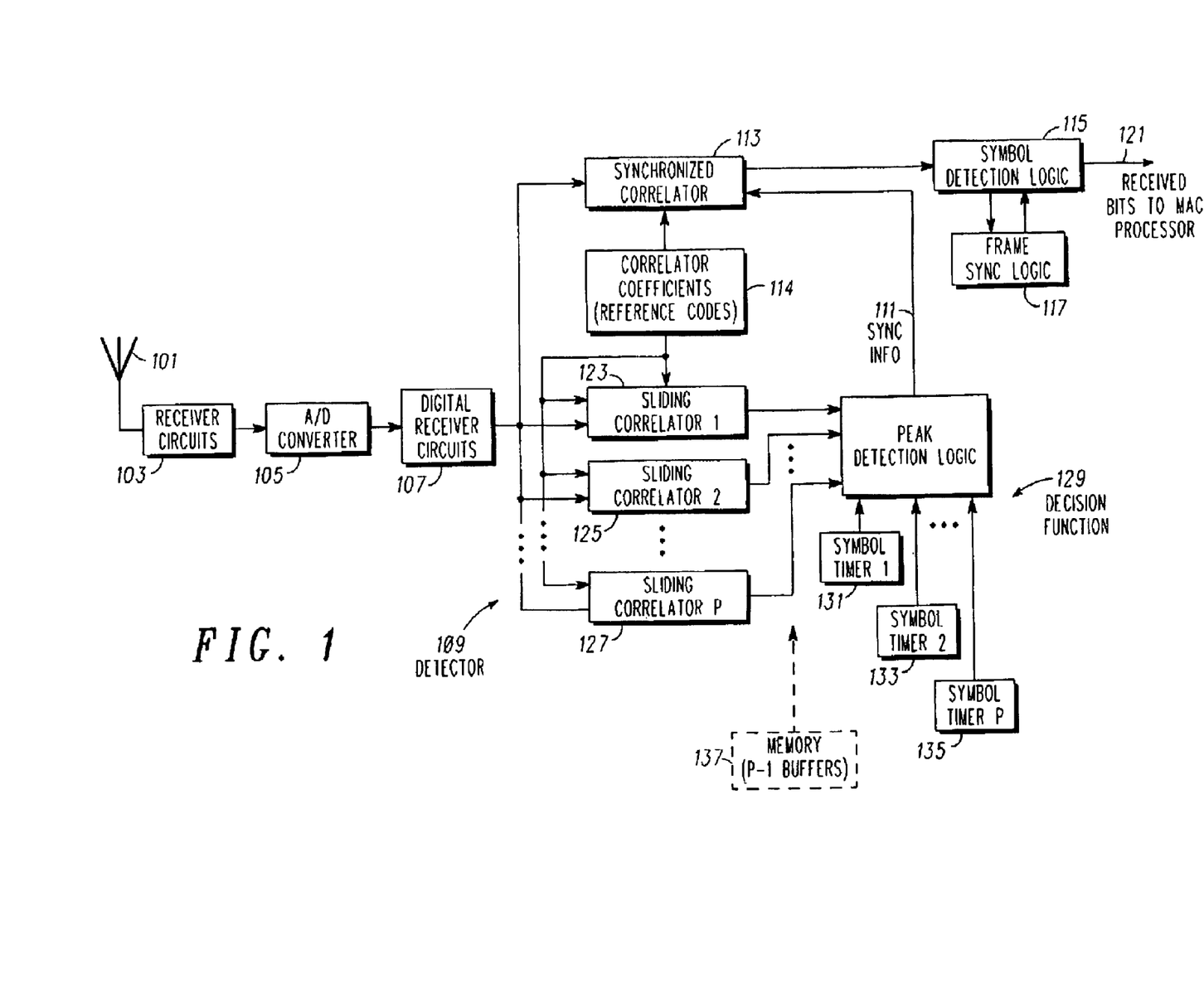
FIG. 1 depicts, in an exemplary receiver, an exemplary block diagram embodiment of a detector configured for detecting presence of a data frame in accordance with the present invention.

Much of the inventive functionality and many of the inventive principles are best implemented with or in integrated circuits (ICs) and software or firmware instructions and associated processors, such as custom or semi-custom ICs, e.g., application specific ICs. It is expected that one of ordinary skill, notwithstanding possibly significant effort and many design choices motivated by, for example, available time, current technology, and economic considerations, when guided by the concepts and principles disclosed herein will be readily capable of generating such instructions and ICs with minimal experimentation. Therefore, in the interest of brevity and minimization of any risk of obscuring the principles and concepts according to the invention, further discussion of such software and ICs, if any, will be limited to the essentials with respect to the principles and concepts of the preferred embodiments Referring to FIG. 1, a portion of an exemplary receiver including an exemplary embodiment of a detector configured for detecting presence of a data frame in accordance with the present invention will be discussed and described. The receiver portion of FIG. 1 shows a receiver from the antenna through symbol detection, such as a receiver for ISM or FRS services or other receiver suitable for high levels of integration and processing complex modulation signals. In one or more embodiments the receiver is arranged to receive signals using a CDMA air interface protocol in accordance with the IEEE 802.15.4 standard. Receivers in accordance with IEEE 802.15.4 in various embodiments operate around 2450 MHz although some embodiments are available in the 868-868.6 and 902-915 MHz frequency bands. Note that nothing limits the inventive concepts and principles discussed and described below to a particular frequency band or particular modulation scheme or air interface protocol and that the information provided above is by way of example only.

The receiver of FIG. 1 includes or is inter-coupled to a generally known antenna system 101 at receiver circuits 103. The receiver circuits are generally known and will vary with the specifics of the operating frequency and the like, but generally can include, e.g., low noise amplifiers (LNAs), mixer stages for down conversion of the radio frequency signal to an intermediate frequency (IF) or baseband frequency. Typically the mixer stage is a complex mixer that is driven by a local oscillator and provides quadrature signal components, e.g., in phase (I) quadrature (Q) signal components as is known. The receiver is tuned or set to a given channel by adjusting the frequency of the local oscillator (typically via some form of known synthesizer and general controller). From the mixer stages, the down converted receiver signal (I&Q) is filtered by filters and amplified by respective Intermediate Frequency (IF) amplifiers that may be variable gain amplifiers.

The resultant signal (I & Q components) is coupled to Analog to Digital converters (ADC) 105 where it is converted to a digital signal (I samples and Q samples) and from there, in one or more embodiments, coupled to digital receiver circuits 107. Note that in some embodiments the receiver circuits 103 and ADC may be advantageously implemented in an analog integrated circuit and the digital receiver circuits 107, as the name suggests, can be implemented together with the balance of the receiver as one or more digital integrated circuits. Generally the digital receiver circuits can include, e.g., filters to provide selectivity for the receiver as well as known offset (DC offset) correction functions to account for or mitigate any imbalance in the receiver circuits 103 or ADC 105 and any frequency differences between the transmitter and receiver. Further included are various functions related to automatic gain control (AGC) that may be coupled to the receivers circuits 103 or specifically variable gain amplifiers therein and operate to provide an appropriate received signal level for further processing. Note that when the receiver is first tuned to a particular channel the offset correction and AGC functions will operate to remove or otherwise mitigate any offset in the received signal and set proper gain levels, if a signal sufficient for processing is present.

The output from the digital receiver circuits 107 will be samples of I and Q received data signals as filtered, etc. by the digital receiver circuits with AGC and offset applied after a period of time. This data as received or data samples corresponding to a received signal is/are coupled to a detector 109 that is configured for detecting presence of a data frame and in some embodiments providing an indication for synchronizing to symbols within the data frame. The detector and corresponding methods of detecting therein as further described below provides symbol synchronization information at 111 to a synchronized correlator 113. The synchronized correlator is also coupled to the data samples and once it is synchronized in accordance with the information at 111, essentially correlates the received data or data samples with each member, i.e., symbol, of the modulation constellation (using information, codes, or coefficients corresponding to that symbol from correlator coefficients memory 114) and selects the strongest correlation for each symbol period and provides that to symbol detection logic 115. The symbol detection logic is coupled to a frame synchronization function 117. The frame synchronization function 117 facilitates locating particular symbols, i.e., predetermined symbols at a corresponding predetermined position where these symbols denote the start of a frame or start of the payload for a frame. These symbols can be referred to as Start Frame Delimiter (SFD) symbols. The symbol detection logic essentially looks at the correlation data from the synchronized correlator and selects a symbol for each symbol time period and converts that symbol to received bits. The received bits are passed to a MAC (media access control) processor at 121 to be further used or utilized as appropriate. Note that in CDMA or direct sequence spread spectrum systems this correlator 113 and detector 109 may be referred to as a dispreading function.

The detector 109, as noted above, is arranged, constructed, and configured for detecting presence of a data frame and in some embodiments providing an indication suitable for establishing symbol synchronization with the received data or data samples. The detector 109 may also be referred to as a polyphase preamble detector and comprises a first correlator 123, e.g., sliding correlator, that is arranged and configured to provide a first plurality of correlations corresponding to the similarity between data as received and first information, e.g., appropriate coefficients from the coefficient memory 114, that denotes the data frame. The detector further includes a second correlator 125 that is configured to provide a second plurality of correlations corresponding to similarity between the data as received and second information, e.g., appropriate coefficients from memory 114, that denotes the data frame. The second information includes a portion of the first information. Furthermore, the detector 109 includes decision logic 129 that is coupled to the first correlator and the second correlator. The decision logic is arranged and configured to provide an indication that the data frame is present, e.g., the symbol synchronization information at 111, where the indication is based on the first plurality of correlations and the second plurality of correlations. Note that the detector in some embodiments may further include additional correlators 127, e.g., P correlators, that are each configured to provide an additional plurality of correlations corresponding to similarity between the data as received and additional information from the memory 111 that denotes the data frame, where the additional information includes a portion of the first information.

In one or more embodiments as will become more evident given the discussion below, the correlators are arranged to provide a correlation for each sample of the data as received (data sample), where the correlation provided or calculated for a new sample will span a number of samples equivalent to the number of samples corresponding to a symbol taking into account any over sampling that may be occurring. For example, in one or more embodiment in accordance with the invention, the received signal is 2× over sampled and 64 of these samples spans a time period equivalent to a symbol. In these embodiments, it can be appropriate to perform a correlation using every other sample spaced over a total of 64 samples (spaced over 63 samples when the end sample is ignored) and to repeat performing this correlation for 64 samples to provide a sequence or plurality of correlations spanning a symbol period.

The correlator 123, 125, . . . , 127 are coupled to the decision logic 129 or decision function and provide the respective plurality of correlations, e.g., one for each sample, to the decision function 129. The decision function 129 in various embodiments basically looks for correlation peaks that are spaced apart or separated by approximately a symbol period and provides the indication at 111 when this situation is detected. Since the correlators are providing correlations that overlap, i.e. overlap in accordance with the portion of the information that is common to another correlator, the decision function 129 is provided with inputs from timers that correspond with each of the correlators, e.g., first timer 131, second timer 133, . . . , P timer 135. These timers tell the decision function when a, respective, correlator has provided a symbols worth of correlations and thus when a peak should be selected from those correlations. The symbol synchronization information is essentially the location of the peaks that are appropriately separated (i.e., peak index) as found by the first correlator, second correlator, or P correlator. The peak index is used to synchronize the synchronized correlator 113 to the symbols as received. Note that if a buffer 137 is inserted between the outputs of the correlators and the decision function where the buffer includes sufficient stages to account for the overlap among the P correlators, only one timer will be required. For example, suppose only two correlators are used and that the second correlator lags but overlaps the first correlator by one half of a symbol, i.e., uses information that includes exactly half of the first information. Note also that in some embodiments as will be further discussed below, where the information used by the second correlator is related by a circular shift to the information used by the first correlator, the second correlator may use information consisting of the first and second halves of the information used by the first correlator where the halves are swapped. In these instances it would be expected that the first correlator would provide a strong correlation one half of a symbol period prior to the second correlator and thus a buffer of 32 stages between the first correlator and the decision function would appropriately align the correlations from the two correlators.

To summarize briefly the detector operation or corresponding method of detecting presence of a data frame in data samples as received, the following processes are performed. A first process includes correlating the data samples with a first ordered set of coefficients corresponding to a known symbol sequence over a plurality of symbol periods to provide a sequence of first correlations over each symbol period. The known symbol sequence is associated with the data frame being present. Next, correlating the data samples with a second ordered set of coefficients over a portion of the plurality of symbol periods to provide a sequence of second correlations over each symbol period is performed, where the second ordered set of coefficients includes a portion of the first ordered set of coefficients. Then the procedure includes selecting a strongest first correlation from the sequence of first correlations for each symbol period and a strongest second correlation from the sequence of second correlations for each symbol period and determining whether the data frame is present based on the strongest first correlation with associated first location index and the strongest second correlation with associated second location index for each symbol period.

Figure 2:
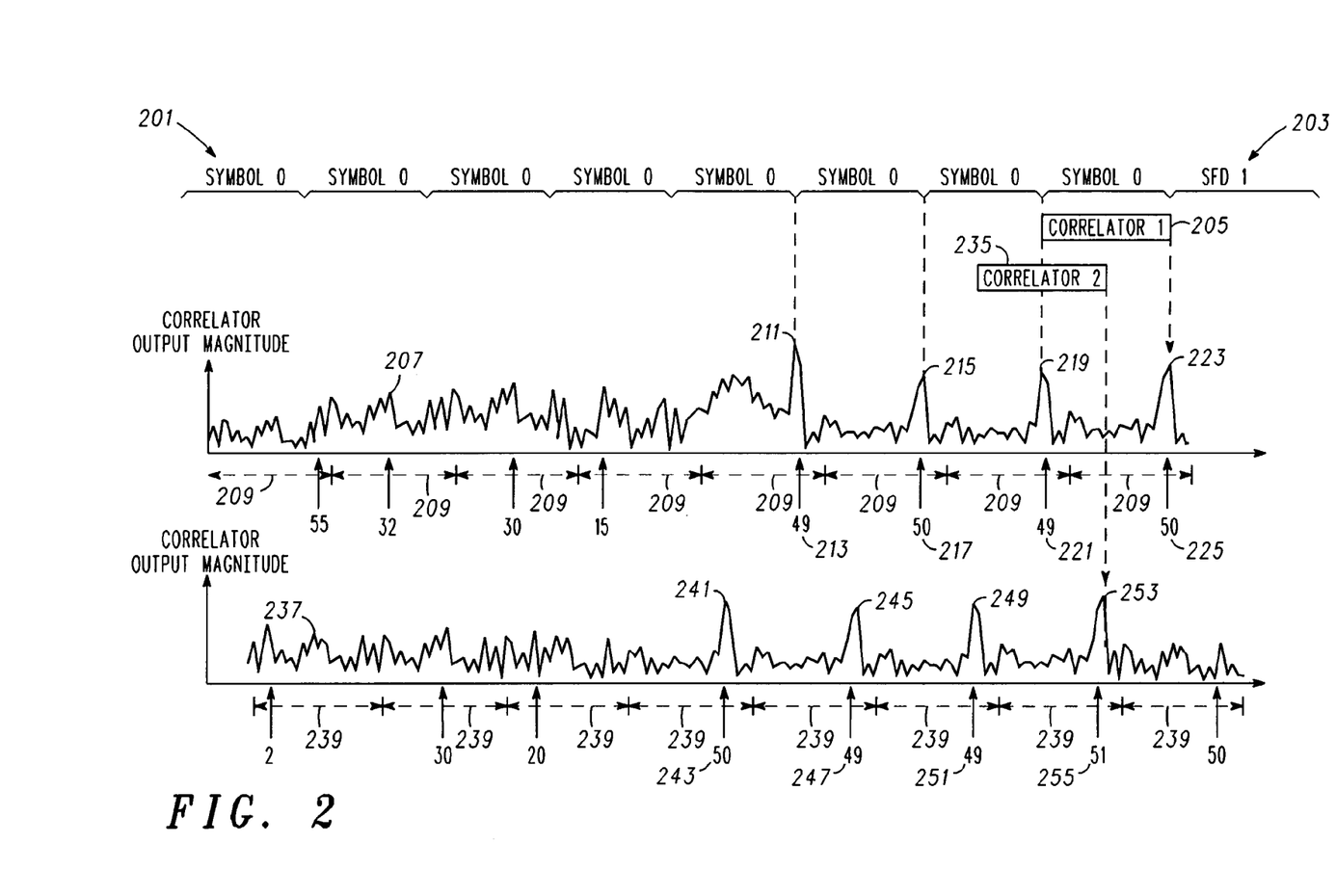
FIG. 2 shows an exemplary diagram of a portion of a data frame and exemplary waveforms for the detector of FIG. 1 in accordance with the present invention.

Referring to FIG. 2, an exemplary diagram of a portion of a data frame and exemplary waveforms for the detector of FIG. 1 in accordance with one or more embodiments of the present invention will be briefly discussed and described. The exemplary diagram shows a possible preamble symbol sequence comprising a predetermined or known sequence of symbols 201, e.g., 8 symbols, each of which represents a "0" symbol, followed by an SFD 1 symbol 203. The actual symbol demarcation and symbol period (symbol time period or time duration) is represented by the demarcated line beneath the symbol 0 designations. The general idea is if the predetermined sequence of symbols or sufficient portion thereof is detected, i.e., a sufficient number of consecutive symbol 0s occur and other circumstances, e.g., receiver is looking for a data frame, are appropriate, a data frame is determined to be present.

One approach to determining when the predetermined symbol sequence is present is to perform a correlation between the received data and information (e.g., a code or coefficients) representing the predetermined sequence. In FIG. 2, a first correlator 205 (represented by a box), such as the correlator 123 of FIG. 1, performs sequential correlations on received data samples (not specifically shown) where the correlator is correlating a symbol duration worth of data samples with the corresponding information for the expected symbol. Visualize the correlator 205 sliding along data samples corresponding to the sequence of samples, channel noise, etc or alternatively visualize the data samples sliding through the correlator. The resultant exemplary correlator output magnitude is shown by waveform 207 where the correlator magnitudes for the first or earliest data samples are at the left side of the waveform with the correlator magnitudes corresponding to later arriving or latest data samples shown at the right side of the waveform 207.

Note that the correlator does not know where the symbols actually begin as evidenced by the plurality of hypothetical symbol periods 209 that begin and end in the midst of respective symbols in the sequence of symbols 201. As would be expected when the data samples corresponding to a symbol 0 are aligned with the information or coefficients representing a symbol 0 the strongest correlation or largest correlation magnitudes are observed once offset and gain mitigation has occurred. See for example correlator magnitude peaks at index locations 55, 32, 30, 15 prior to offset or gain corrections in contrast with peak 211 at index 49 213, peak 215 at index 50 217, peak 219 at index 49 221, and peak 223 at index 50 225, where the index values represent, e.g., $49^{th}$ correlation and $49^{th}$ sample out of 64 samples (number of samples equivalent to a symbol in the exemplary embodiment of FIG. 2) for peak 211, 219. There may be some variation in the index values for the peaks due to noise or the like in the received signal, however it will be evident that strong peaks are occurring at approximately a symbol period apart once any offset and gain correction has occurred During the time period that offset and gain correction are being determined and applied correlation magnitudes may not be as strong and peak values within symbol periods 209 may not be as uniformly spaced (see index values 55, 32, 30, 15).

Now consider a second correlator 235, such as correlator 125, that "overlaps" as depicted the first correlator by, e.g., a half symbol. The second correlator performs correlations between the received data and corresponding second information (codes or coefficients), where the second information includes part of the information used by the first correlator 205. For example in the embodiment of FIG. 2 where the second correlator "overlaps" the first correlator by ½ symbol, the second information would comprise, viewed from left to right, the later half of information corresponding to one symbol, e.g., codes or coefficients for one symbol followed by the earlier half of the information corresponding to a later sequential symbol, e.g., the information used by the first correlator 205. Note that in practice the first and second correlators are typically operating contemporaneously on the same received data samples, but using different information (codes or coefficients) to perform the correlations, however as depicted strong uniformly spaced peak correlation magnitudes will occur at different times and the hypothetical symbol periods 209 and 239 will vary from each other.

The correlation magnitudes out of the second correlator 235 are shown as the waveform 237 over a plurality of hypothetical symbol periods 239. Again note that the second correlator while synchronized to the first correlator with a fixed or known offset, e.g., ½ symbol, does not know where the actual symbols begin and end as evidenced by the symbol periods 239 beginning in the midst of respective symbols in the sequence of symbols 201. The initial correlations are not particularly strong and the early peaks may not be uniformly spaced (see index values 2, 30, 20) for the reasons discussed above. The later peaks show strong correlations and reasonably uniformly spaced peak index values (peak 241 with index value 50 243, peak 245 with index value 49 247, peak 249 with index value 49 251, and peak 253 with index value 51 255). Note that the strongest correlations occur where the data samples are nearly aligned with the second information, e.g., approximately ½ symbol from peaks out of the first correlator in the exemplary embodiment of FIG. 2. Generally by providing additional correlations from a second correlator that are at least to some degree independent of the correlations from the first correlator more accurate detections of a data frame can be made.

The specifics of the first information and second information will depend on the particular air interface protocol, e.g., predetermined symbol pattern or symbol sequence that denotes a data frame, however at least part of the second information (determined by the extent of the "overlap" between the correlators) will be the same as the first information, albeit in different locations in the respective correlators. For some air interface protocols other relationships may be available. For example, in IEEE 802.15.4 systems one of 16 different symbols is transmitted during each symbol period. Symbol 0 consists of a 32 chip pseudo random (PN) code ($C_0$, $C_1, \ldots, C_{31}$), symbol n=1, 2, ... 7 are the symbol 0 PN code circularly shifted by 4n chips and symbol n=8, 9, ..., 15 are conjugates (negate odd chips) of symbol n=0, 1, 2, ..., 7. For example, the 32 transmitted chips for symbol 0 in order of transmission ($C_0$-$C_{31}$) are:

1 1–1 1, 1–1–1 1, 1 1–1–1, –1–1 1 1, –1 1–1 1, –1–1 1–1, –1–1 1–1, 1 1 1–1 while the 32 transmitted chips for symbol 4 is the symbol 0 pattern circularly shifted by 16 chips, specifically:

–1 1–1 1, –1–1 1–1, –1–1 1–1, 1 1 1–1 1 1–1 1, 1–1–1 1, 1 1–1 1, –1–1 1 1 and the 32 transmitted chips for symbol 8 are (symbol 0 with odd chips negated):

1–1–1–1, 1 1–1–1, 1–1–1 1, –1 1 1–1, –1–1–1–1, –1 1 1 1, –1 1 1 1, 1–1 1 1 1 where all other PN codes for all other IEEE 802.15.4 symbols can be formed following the rules noted and exemplified above or these patterns may be found in the IEEE 802.15.4 standard.

Figure 3:
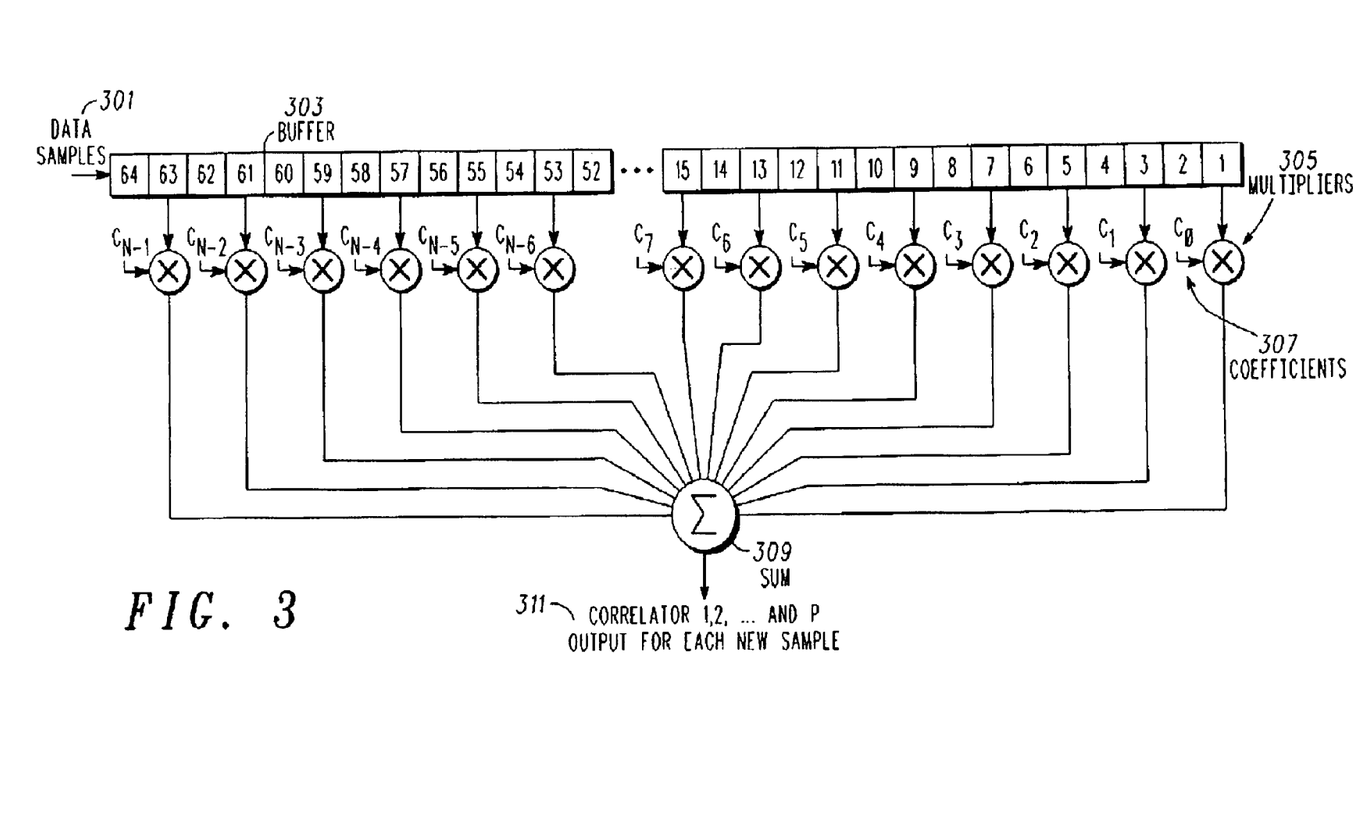
FIG. 3 illustrates an exemplary functional embodiment of a correlator suitable for use in the detector of FIG. 1 in accordance with the present invention.

Referring to FIG. 3, an exemplary functional embodiment of a correlator suitable for use in the detector of FIG. 1 in accordance with the present invention will be briefly discussed and described. In one or more embodiments data samples 301 are input at a 4 Million Sample per second (MS/s) rate into a buffer 303, i.e., a FIFO buffer, with a multiplicity of stages configured to store a corresponding multiplicity of samples of the data as received and these samples are shifted from left to right as new samples are input. These samples in some embodiments are complex samples with 4 bits for each of the I and Q portion of the sample. As depicted and in a system where each chip is over sampled at a 2× rate there will be two complex samples for each chip. Thus in this instance where the number of chips for each symbol is 32, the buffer will be 64 stages in length (actually only needs to be 63 samples long since either the first sample or in alternative embodiments the last sample is not yet being or will never again be used in the correlations).

Further shown is a multiplier/adder tree comprising a multiplicity of multipliers 305 configured to multiply each sample of the multiplicity of samples by a corresponding portion of the appropriate information, e.g., $C_0, C_1, \ldots, C_{N-1}$ 307, to provide partial correlations at the output of the respective multipliers. Note that these multiplications are complex multiplications yielding a complex result. Note that a multiplier is coupled to every other stage and thus every other sample in the buffer. The correlator, specifically multiplier/adder tree further includes an adder or summer 309 that is arranged and configured to sum the partial correlations, e.g., 32 partial correlations in this embodiment, to provide a sum at 311, i.e., complex sum, corresponding to a correlation of the multiplicity of samples and the information or coefficients. The correlator of FIG. 3 can be advantageously used to implement correlators 123, 125, ... 127 by merely over clocking the multipliers 305 and summer 309 with each cycle of this clock also loading or otherwise providing the appropriate information, i.e., $C_0, C_1, \ldots, C_{N-1}$ to the multipliers for each correlation. For example, once a new sample is loaded and the others are shifted the coefficients for a first symbol, e.g., the symbol 0, can be provided to the respective multipliers and multiplication and adding can occur thereby providing a first correlator output, e.g., correlation corresponding to symbol 0. Next with the same data samples and new coefficients for another symbol or the like, e.g., symbol 4, are provided to the multipliers and the calculations are repeated thus providing a second correlator output, e.g., correlation corresponding to symbol 4 and this process can be repeated for P correlations, e.g., 4, 6, 8, or more correlations.

FIG. 3 shows one embodiment where the first and second correlators collectively include a first in first out (FIFO) buffer 303 with a multiplicity of stages configured to store a corresponding multiplicity of samples of the data as received and to shift the samples whenever a new sample is loaded into the FIFO buffer, a multiplicity of multipliers 305, and a summer 309. The multiplicity of multipliers 305 is configured to first multiply each sample of the multiplicity of samples by a corresponding first coefficient of a first multiplicity of coefficients included with first information (e.g., coefficients for symbol 0) to provide first partial correlations and second multiply the each sample of the multiplicity of samples by a corresponding second coefficient of a second multiplicity of coefficients included with second information (e.g. coefficients corresponding to overlapped symbol—symbol 4) to provide second partial correlations, wherein the first multiply to provide the first partial correlations and the second multiply to provide the second partial correlations occur whenever a new sample is loaded into the buffer. The summer 309 is configured to sum the first partial correlations to provide a first sum corresponding to a correlation of the multiplicity of samples and the first multiplicity of coefficients and to sum the second partial correlations to provide a second sum corresponding to a correlation of the multiplicity of samples and the second multiplicity of coefficients, wherein the first sum and the second sum are provided whenever a new sample is loaded into the buffer. Note the multipliers and summer may be shared and used to perform additional correlations.

Thus FIG. 3 and the above discussions illustrate one embodiment of a correlator and corresponding method of correlating data samples with a first ordered set of coefficients corresponding to a known symbol or symbol sequence over a plurality of symbol periods to provide a sequence of first correlations over each symbol period, where the known symbol sequence is associated with a data frame being present and then correlating the data samples with a second ordered set of coefficients over a portion of the plurality of symbol-periods to provide a sequence of second correlations over the symbol period, where the second ordered set of coefficients includes a portion of the first ordered set of coefficients. This can further include correlating the data samples with one or more additional ordered sets of coefficients over the portion of the plurality of symbol periods to provide one or more additional sequences of additional correlations over the each symbol period, where the one or more additional ordered sets of coefficients include a portion of the first ordered set of coefficients. Additional exemplary embodiments will be described below with reference to FIG. 7 through FIG. 9.

Figure 4:
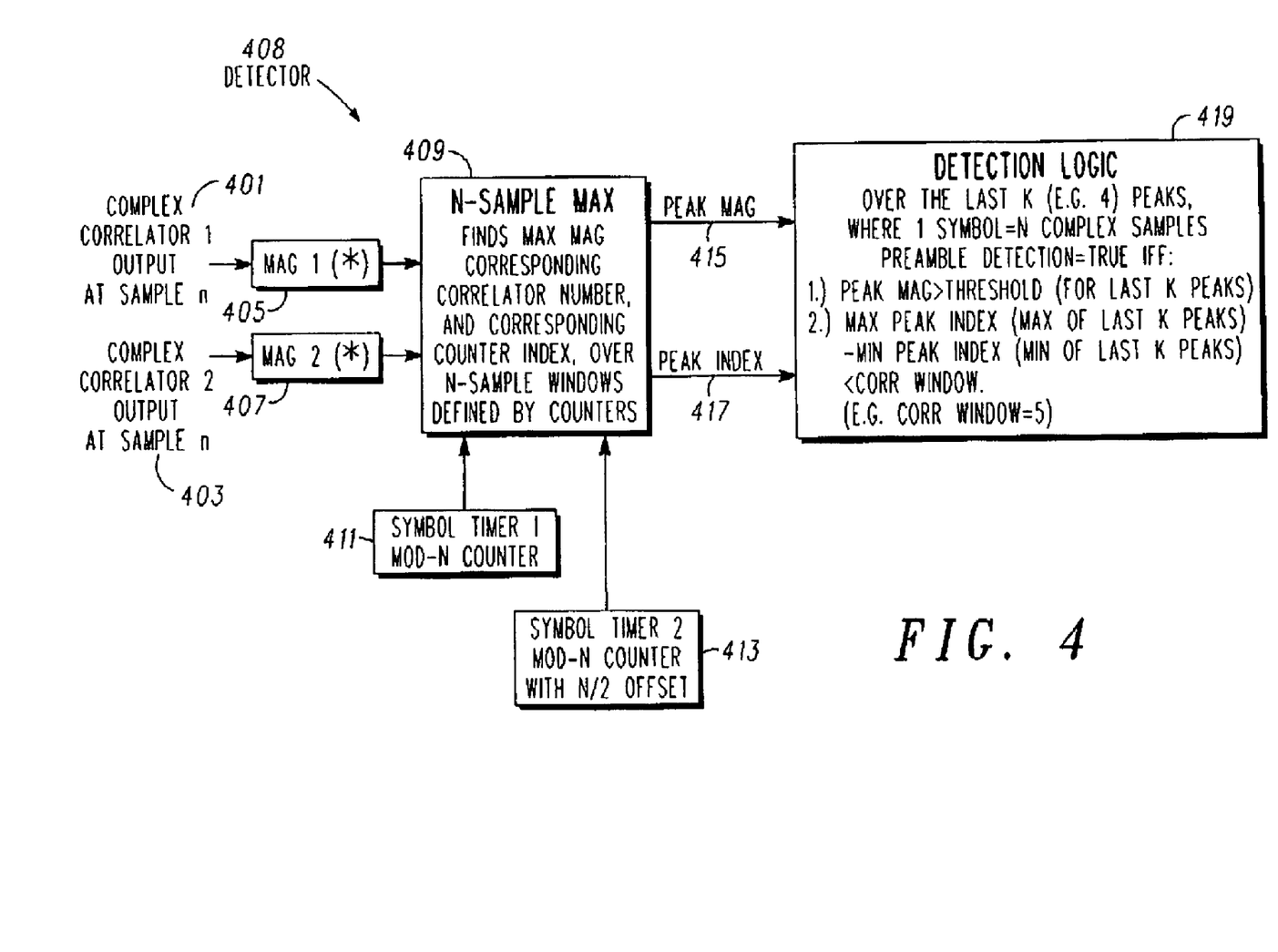
FIG. 4 illustrates a diagram of decision logic or processes suitable for use in the detector of FIG. 1 in accordance with the present invention.

Referring to FIG. 4, a diagram of decision logic and corresponding processes suitable for use in the detector of FIG. 1 in accordance with the present invention will be briefly discussed and described. It will be appreciated that the decision logic and processes can be implemented in a processor executing appropriate software instructions or in hardware or various combinations of each. Given one or more complex correlations from one or more correlators 401, 403 for each sample n, e.g., correlations at the output 311, a magnitude ($\{I^2+Q^2\}^{1/2}$; square root of sum of squares of I and Q) for each of these correlations is determined at the magnitude functions 405, 407. These magnitudes are coupled to a peak detector 408 that is configured to find correlation peaks from the plurality of correlations that are separated by a predetermined time period, e.g., approximately a symbol period, and second correlation peaks from the second plurality of correlations that are separated by the predetermined time period. More specifically a maximum detector 409 is arranged for selecting a strongest correlation, i.e., peak magnitude, from each sequence of correlations for a corresponding symbol period.

Thus the detector 408 in one or more embodiments with two correlators is configured for selecting a strongest first correlation from the sequence of first correlations for each symbol period and a strongest second correlation from the sequence of second correlations for each symbol period. Where there are N, e.g., 64, samples per symbol period, the largest magnitude one of 64 correlations will be selected or identified as the peak magnitude along with the particular correlator that provided the correlation and an index value, e.g., a counter value from a corresponding MOD N (N=64) counter (counter 1, counter 2) 411, 413. The index value or counter value establishes the location of the strongest correlation within a particular symbol period or correlation span, thus the data samples that yielded the correlation, and thus the location where a symbol begins in the received data samples (information to synch the synchronized correlator 113). It will be appreciated, that the strongest correlation for the different correlators will not usually occur at the same time, however it will occur at or very near to the same index value as determined by the respective counters.

The peak magnitude and peak index (including correlator id) are coupled at 415, 417 to detection logic 419 (part of the peak detector 408). The detection logic 419 is configured for determining whether the data frame is present based on the strongest first correlation(s) with associated first location index and the strongest second correlation(s) with associated second location index for each symbol period. Essentially the detection logic 419 determines whether over the last predetermined number of peak magnitudes (e.g., a count threshold=4), each of the peak magnitudes was greater than a threshold and each of the peak magnitudes was located within a particular window, e.g., within 5 samples. The detection logic 419 comprises a comparator for determining whether each or any of the peak magnitudes, e.g., the first correlation peaks and the second correlation peaks, satisfy a threshold, and a window function for determining whether the first correlation peaks and the second correlation peaks that satisfy a threshold fall within a time window (max peak index−min peak index is less than a window, e.g., 5) around the predetermined time period, e.g., symbol period. When the predetermined number of peaks that satisfy these conditions are found the preamble and thus data frame has been detected and synchronization information or a presence indication and associated location (index) is provided at, e.g., 111. Note that the specific number of peaks, thresholds or window span may be determined by experiment given a particular system and detection objectives. For example less peaks will result in detection decisions being made faster but likely more false positives, etc.

Thus the detection logic uses processes for determining whether the data frame is present that includes determining whether a magnitude of the strongest first correlation satisfies a threshold and whether a magnitude of the strongest second correlation satisfies a threshold for one or more symbol periods. Furthermore, the determining whether the data frame is present further comprises determining, when at least one of the magnitude of the strongest first correlation satisfies the threshold and the magnitude of the strongest second correlation satisfies the threshold for two or more successive symbol periods, whether the timing between successive strongest first correlations and successive strongest second correlations is within a timing window about a symbol period. Additionally, the determining whether the data frame is present comprises counting the occurrences of successive strongest first correlations and successive strongest second correlations being within the timing window and deciding that the data frame is present when the number of occurrences satisfies a count threshold.

Figure 5:
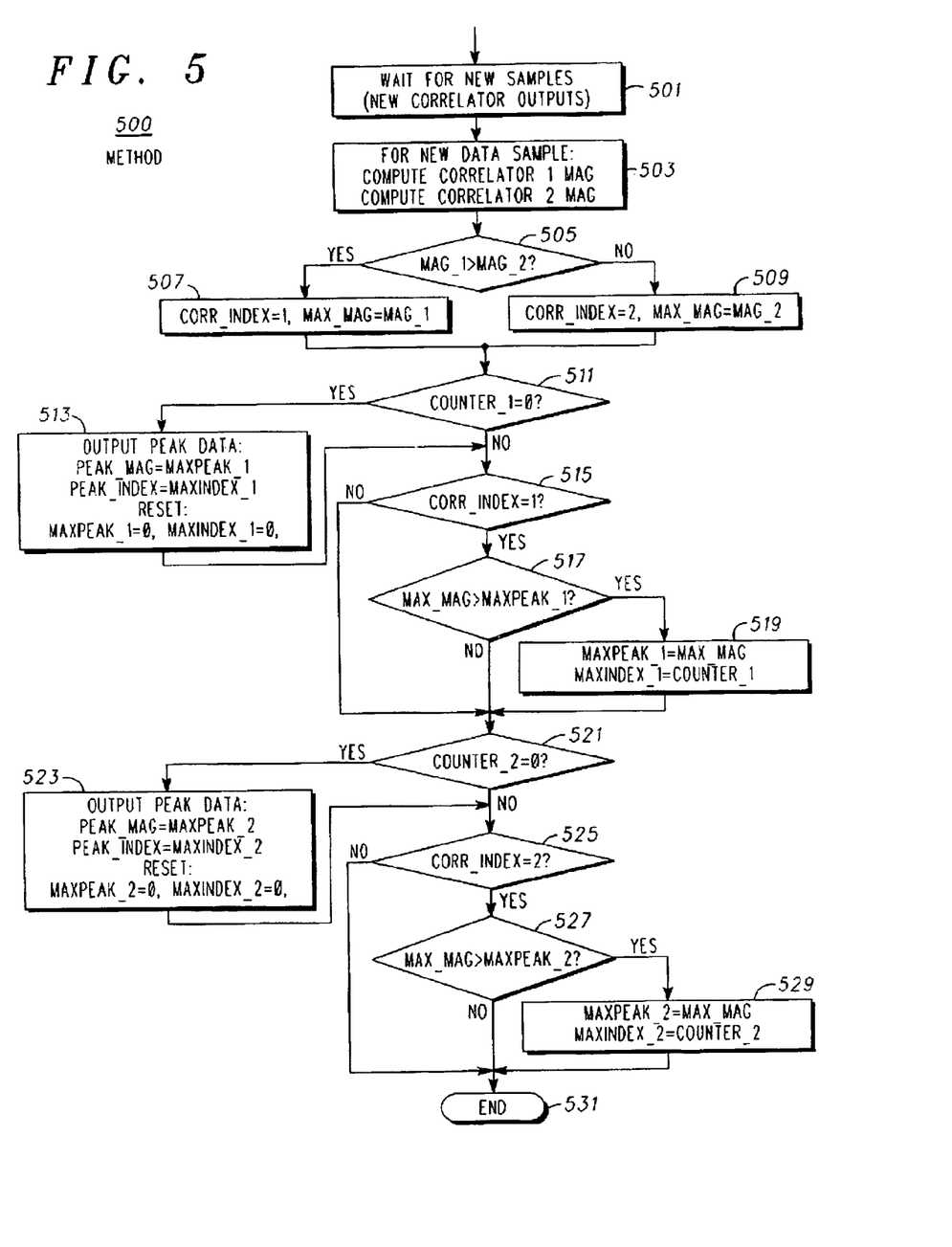
FIG. 5 and FIG. 6 depict flow charts showing a more detailed exemplary embodiment of decision processes suitable for use in the detector of FIG. 1 in accordance with the present invention.
Figure 6:
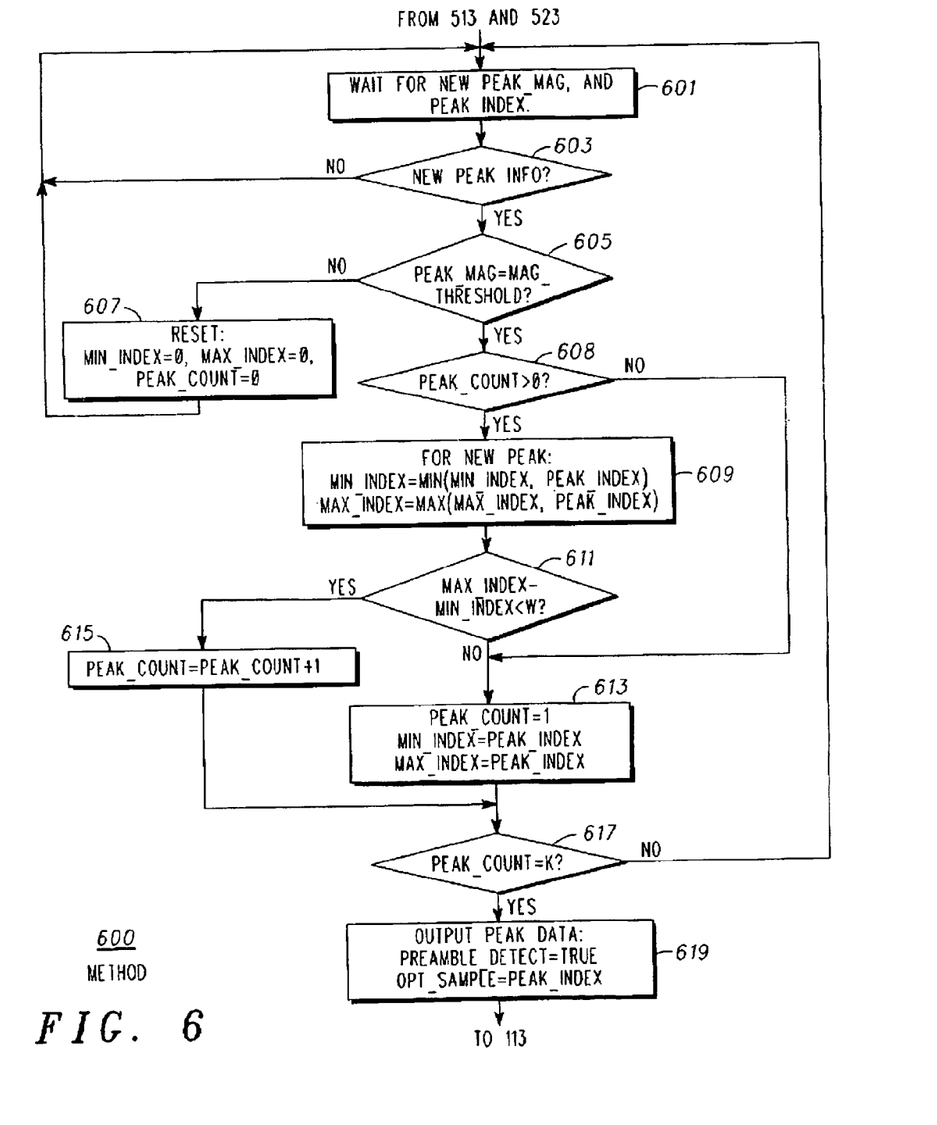

Referring to FIG. 5 and FIG. 6, flow charts showing a more detailed exemplary embodiment of decision processes suitable for use in the detector of FIG. 1 in accordance with the present invention will be briefly discussed and described. It will be appreciated that the more detailed embodiment of FIG. 5 and FIG. 6 is an exemplary approach for implementing the processes described with reference to FIG. 4. The method 500 is a method of selecting the strongest correlation from a first and second sequence of correlations for each symbol period and it will be appreciated that the processes may be expanded for one or more additional sequence of correlations from additional correlators. The method starts and waits for a new data sample and thus new correlation from each of the first and second correlator 501 and once a new data sample (thus correlations) is available, calculates 503 the magnitude of the correlation from the first correlator (Mag_1) and the similar magnitude from the second correlator (Mag_2). Mag_1 is compared to Mag_2 505 and if larger 507 sets a corr_index=1 and if smaller 509 sets the corr_index=2.

Then counter 1 (see symbol timer 1 411) which is a MOD N=64 counter (cyclically counts from 0 to 63 and then repeats the 0 to 63 count) is checked 511 to see if it is equal to 0. If so, peak data is output and various registers are reset 513. Specifically, a Peak magnitude (see 415) is reported that is equal to MaxPeak_1 and Peak_index (see 417) that is equal to MaxIndex_1 is reported or output and MaxPeak_1 and MaxIndex_1 are reset to 0, 0, respectively. If counter 1 is not equal to zero 511 or after 513, the corr_index is checked 515 to see if equals 1. If so, Max_mag is compared 517 to the present value of MaxPeak_1 and if it is greater 519 sets MaxPeak_1 to Max_mag and MaxIndex_1 to the present value of counter 1. After 519 or if the response at 517 or 515 is negative, counter 2 is checked to determine if it is zero 521. If so, peak data is output and various registers are reset 523. Specifically, a Peak magnitude (see 415) is reported that is equal to MaxPeak_2 and Peak_index (see 417) that is equal to MaxIndex_2 is reported or output and MaxPeak_2 and MaxIndex_2 are reset to 0, 0 respectively. If counter 2 is not equal to zero 521 or after 523, the corr_index is checked 525 to see if equals 2. If so, Max_mag is compared 527 to the present value of MaxPeak_2 and if it is greater 529 sets MaxPeak_2 to Max_mag and MaxIndex_2 to the present value of counter 2. The process ends 531 after 525, 527, or 529 but is repeated for each new data sample. Note that this process may be readily extended to add additional correlator results. Note also that the counters (1 & 2) are each incremented by one count each time the method 500 is performed. This can occur when a new data sample is available at 501 or just before the process ends.

Referring to FIG. 6 a more detailed flow chart of one embodiment of the processes of the detection logic will be discussed and described. The method 600 begins with an input from either 513 or 523 and waits 601 for new Peak_Mag and associated Peak_Index until that is available 603. When the peak information is available 603, the Peak_Mag is compared to a Mag_Threshold 605. If the peak magnitude does not satisfy the threshold value, Min_Index, Max_Index, and Peak_Count are each reset to 0 607 and the method returns to 601. If the peak magnitude is large enough 605, and the Peak_count>0 608, a Min_Index is set equal to the smaller of current value for Min_Index and the Peak_Index and a Max_Index is set equal to the larger of a current value for Max_Index and the Peak_Index 609. Then the difference between the Max_Index and the Min_Index is formed and this is compared to a window or timing window value (e.g., 5) 611. If the peak is properly located (611 is yes) a Peak_Count is incremented 615. If the peak is not properly located (within the window, 611 is negative) or if the Peak_Count is not greater than 0 608, the Peak_Count is set to 1 and the Max_Index and Min_Index are set to the Peak_Index 613. After 615 or 613, the Peak_Count is compared to K (a count threshold) and if the Peak_Count is less than K, the method repeats from 601. If the Peak_Count equals K, 619 outputs peak data (synchronization information to 113), specifically the preamble or data frame has been detected and the optimum sample to synch the synchronized correlator to is the one corresponding to the current Peak_Index. Note that in other embodiments, rather than the current Peak_Index a median value of the Index over the last M correlator peaks or a majority value of the Index from the last M correlator peaks can be provided to the synchronized correlator 113.

Figure 7:
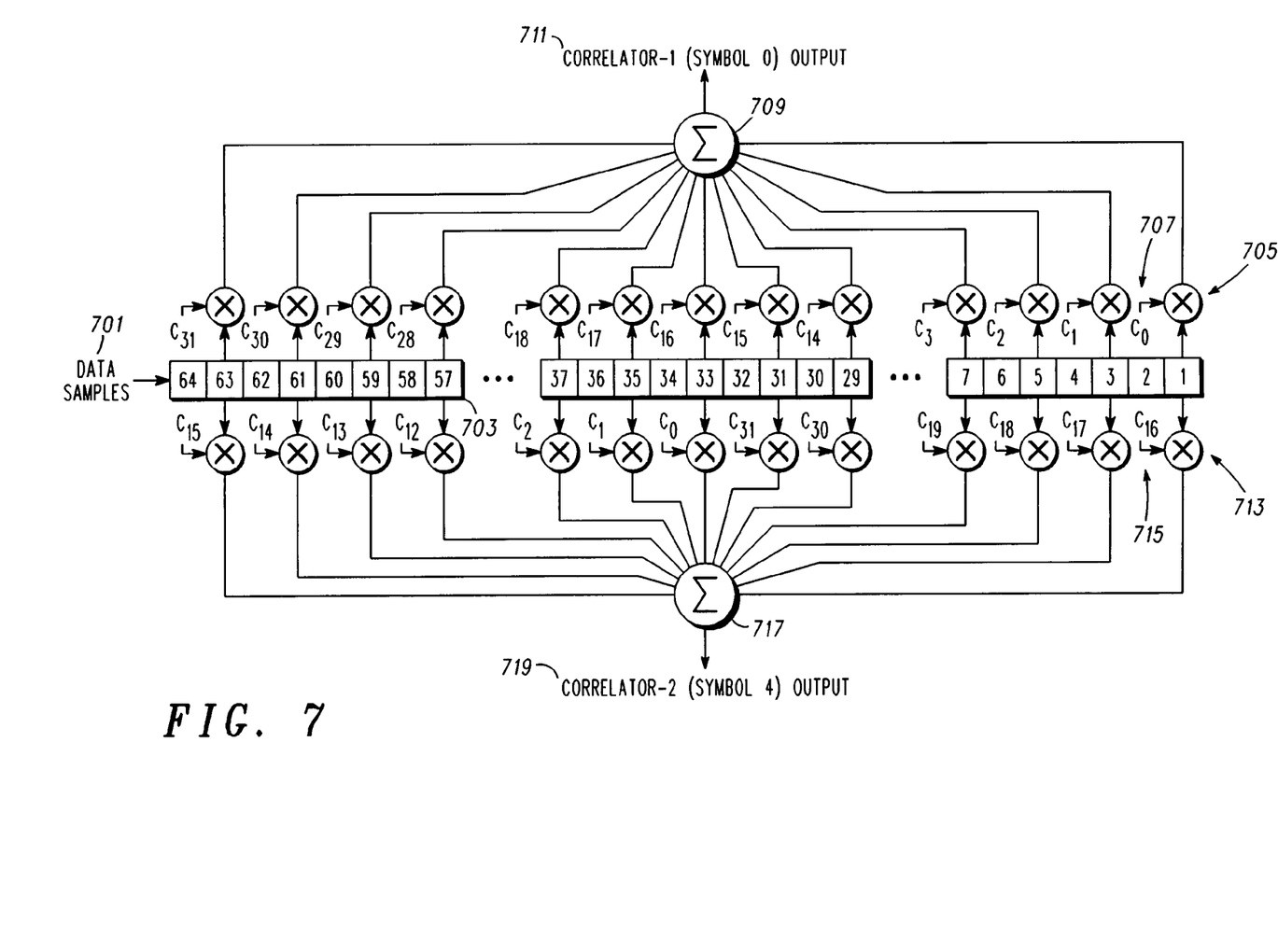
FIG. 7, FIG. 8, and FIG. 9 illustrate alternative embodiments of correlators suitable for use in the detector of FIG. 1 in accordance with the present invention.

Referring to FIG. 7, an alternative embodiment of a correlator suitable for use in the detector of FIG. 1 in accordance with the present invention will be briefly described and discussed. The correlator of FIG. 7 is similar to the correlator of FIG. 3 other than the multipliers and summer are not shared among all of the correlators. The FIG. 7 correlator receives data samples 701 (same samples as data samples 301) into a buffer 703 (note can be same as buffer 303) that includes a multiplicity of stages configured to store a corresponding multiplicity of samples of the data as received, where the buffer is arranged as a FIFO buffer that shifts the samples from left to right as each new data sample is received. This buffer must be long enough to store sufficient samples to perform, i.e., span, the required correlation, e.g., normally the number of samples that would represent a symbol. In the depicted embodiment with 2× over sampling and 32 chips per symbol a buffer with 64 stages could be used (63 is sufficient since one sample will not be used).

In addition to the buffer 703, the first correlator includes a multiplicity of multipliers 705, e.g., one for each chip in the symbol, coupled to certain of the stages, e.g., odd numbered stages, of the buffer and configured to multiply individual samples of the multiplicity of samples by a corresponding portion of the first information (e.g., respective coefficients $C_0$-$C_{31}$ 707) to provide partial correlations at the multiplier outputs. The partial correlations are summed at summer 709 to provide a complex valued sum at 711 corresponding to a correlation of the multiplicity of samples and the first information. The correlation at 711 will be provided as each new data sample is input to the buffer. In addition to the buffer 703, the second correlator includes a multiplicity of multipliers 713, e.g., one for each chip in the symbol, coupled to certain of the stages, e.g., odd numbered stages, of the buffer and configured to multiply individual samples of the multiplicity of samples by a corresponding portion of the second information (e.g., respective coefficients 715) to provide partial correlations at the multiplier outputs. The partial correlations are summed at summer 717 to provide a complex valued sum at 719 corresponding to a correlation of the multiplicity of samples and the second information. The correlation at 719 will be provided as each new data sample is input to the buffer.

In one or more embodiments where a preamble is comprised of a repeated symbol and where a symbol can be represented by a circular shift of another symbol, such as IEEE 802.15.4 systems, the coefficients corresponding to the first and second information will be related to each other. For example as depicted in FIG. 7 the first information includes $C_0$-$C_{31}$ as an ordered sequence or set of coefficients. In IEEE 802.15.4 these coefficients can be the value of the chips for symbol 0 and thus the correlation at 711 corresponds to symbol 0. In FIG. 7 the second information is comprised of an ordered set of coefficients (from right to left) $C_{16}$-$C_{31}$ followed by $C_0$-$C_{15}$, i.e., the chips for symbol 0 circular shifted by 16 places or symbol 4 and thus the correlation at 719 corresponds to symbol 4. The second correlator is correlating the data samples with a second ordered set of coefficients where the second ordered set of coefficients comprises a later portion of the first ordered set of coefficients, e.g., $C_{16}$-$C_{31}$, for a first symbol combined with, e.g., followed by an earlier portion of the first ordered set of coefficients, e.g., $C_1$-$C_{15}$, for a second symbol, where in this instance the first and second symbol happen to be symbol 0 in IEEE 802.15.4 systems. In this instance the correlating the data samples with a second ordered set of coefficients comprises correlating the data samples with a second ordered set of coefficients where the second ordered set of coefficients comprises the first ordered set of coefficients as circularly shifted.

When the correlator of FIG. 3 is compared to the correlator of FIG. 7 it will be evident that the multiplicity of multipliers of FIG. 3 has been replaced or augmented in FIG. 7 to include a first group of multipliers 705 configured to provide the first partial correlations and a second group of multipliers 713 configured to provide the second partial correlations and the summer of FIG. 3 now comprises a first summer 709 configured to provide the first sum and a second summer 717 configured to provide the second sum.

Figure 8:
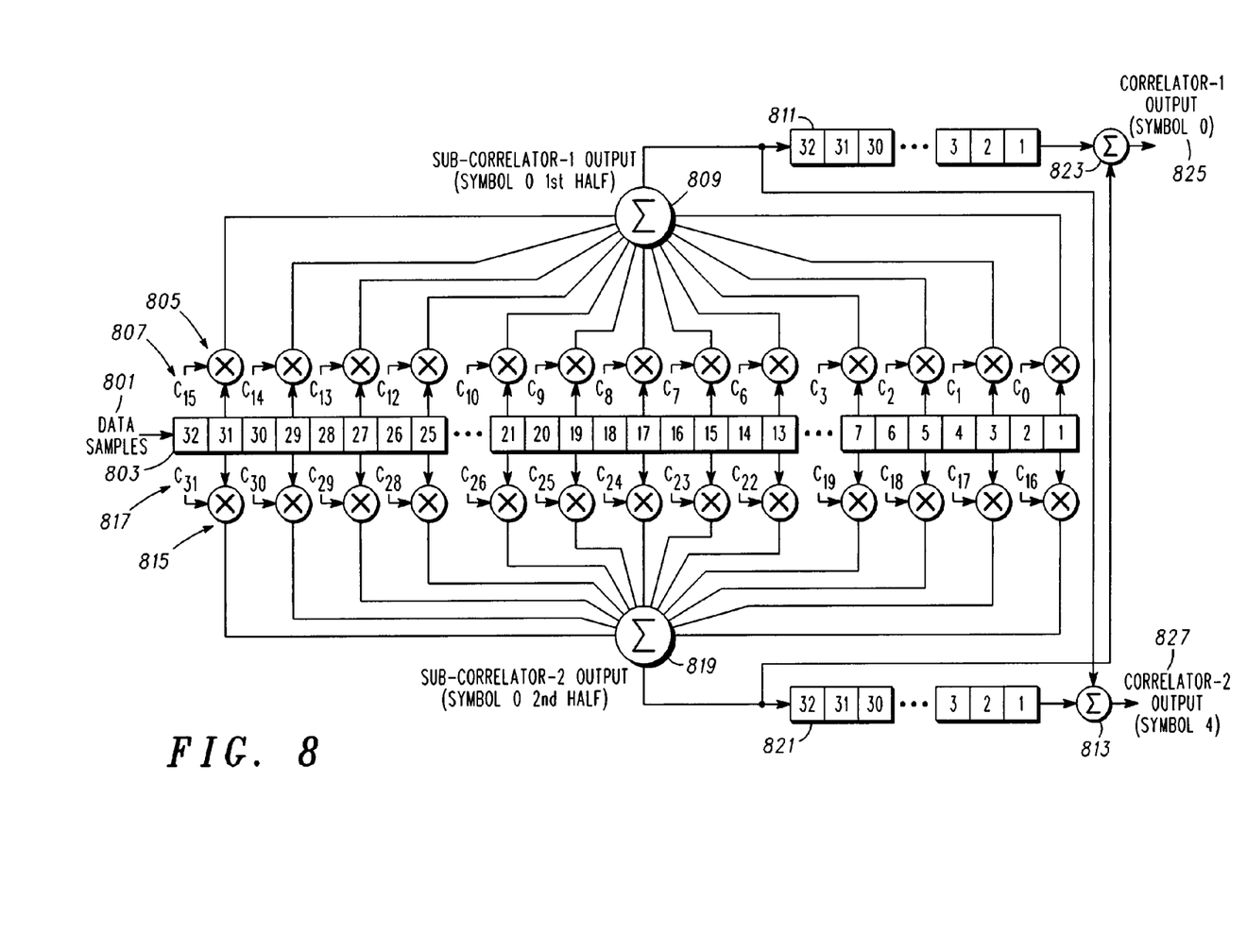

Referring to FIG. 8, another alternative embodiment of a correlator suitable for use in the detector of FIG. 1 in accordance with the present invention will be briefly described and discussed. Data samples 801 are input to a buffer 803. The buffer 803 is again a FIFO buffer configured to shift its contents from left to right one stage for each new sample that is input, however in this instance the buffer can be one half the size of the buffers 303, 703, e.g., 32 stages (31 is all that is needed). Generally the correlator of FIG. 8 performs correlations for one half of a symbol for each sample and stores the half or partial correlation is additional buffers and then appropriately combines the partial correlations with contents of the additional buffers.

More specifically, a first group or multiplicity of multipliers 805, e.g., 16 multipliers, is coupled to a corresponding group or multiplicity of samples, e.g., every other sample in the buffer, as well as a first group or multiplicity of coefficients 807 (e.g., $C_0$-$C_{15}$, i.e., portion of the first information). The outputs of these multipliers and there respective chip correlations are coupled to a first summer 809 that provides a complex first sum representative of a partial correlation corresponding, for example, to a first or early half of symbol 0. The first sum is coupled or provided to a second FIFO buffer 811 that is a half symbol, e.g., 32 stages long, and to a third summer 813. A second group of multipliers 815, e.g., 16 multipliers, is coupled to a corresponding group or multiplicity of samples, e.g., every other sample in the buffer, as well as a second group or multiplicity of coefficients 817 (e.g., $C_{16}$-$C_{31}$, i.e., portion of the second information). The outputs of these multipliers and there respective chip correlations are coupled to a second summer 819 that provides a complex second sum representative of a partial correlation corresponding, for example, to a second or later half of symbol 0. The second sum is coupled or provided to a third FIFO buffer 821 that is a half symbol, e.g., 32 stages long, and to a fourth summer 823. An output of the second FIFO buffer 811 is coupled to the fourth summer 823 and an output of the third FIFO buffer 821 is coupled to the fourth summer 813. The third summer 823 is configured to add the output from the second FIFO buffer 811 and the output of the second summer 819 together to provide a correlation for each new data sample and thus provide a first plurality of correlations corresponding to the first symbol, e.g., symbol 0. Similarly, the fourth summer 813 is configured to add the output from the third FIFO buffer 821 and the output of the first summer 809 together to provide a correlation for each new data sample and thus provide a second plurality of correlations corresponding to the second symbol, e.g., symbol 4. It will be appreciated that, e.g., the multipliers 805 and summer 809 can be over clocked and shared among the first and second correlator in a manner similar to FIG. 3.

Note that in the depicted embodiment the first information (e.g., corresponding to symbol 0 in IEEE 802.15.4) can comprise the first multiplicity of coefficients with the second multiplicity of coefficients appended thereto and the second information (e.g., corresponding to symbol 4 in IEEE 802.15.4) can comprise the second multiplicity of coefficients with the first multiplicity of coefficients appended thereto. Thus the correlation process of FIG. 8 includes sequentially shifting the data samples through a FIFO buffer with a multiplicity of stages while correlating data samples within the FIFO buffer with at least a portion of a first ordered set of coefficients, e.g., portion of symbol 0, to provide a first partial correlation that corresponds to and may be used to provide a sequence of first correlations corresponding, e.g., to symbol 0, and correlating the data samples within the FIFO buffer with at least a portion of the second ordered set of coefficients, e.g., portion of symbol 4, to provide a second partial correlation that corresponds to and may be used to provide a sequence of second correlations corresponding, e.g., to symbol 4. It will be evident to those of ordinary skill, given these discussions, that the concepts and principles of FIG. 7 may be extended to provide a correlation for each of symbol 0, 2, 4, and 6, for example. Note that doing this will decrease the size of FIFO buffer 803 to, e.g., 8 samples but increase the size and number of additional FIFO buffers and summers, etc.

Figure 9:
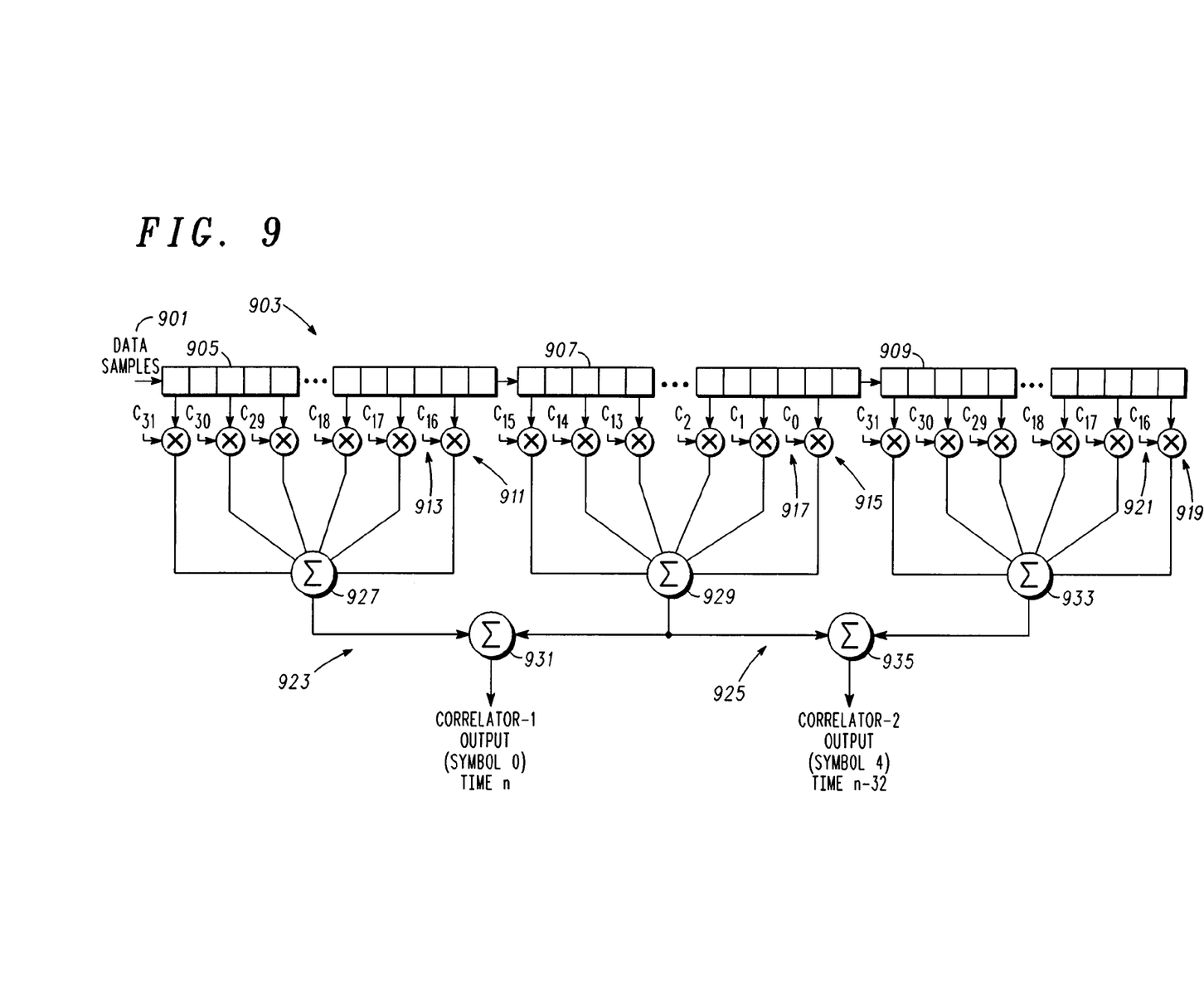

Referring to FIG. 9, a further alternative embodiment of a correlator suitable for use in the detector of FIG. 1 in accordance with the present invention will be briefly described and discussed. Data samples 901 are input to a FIFO buffer 903 with a multiplicity of stages (96 stages) configured to store a corresponding multiplicity of samples of the data as received and to shift the samples whenever a new sample is loaded into the FIFO buffer. As shown the buffer includes a first section of 32 stages 905+a second section of 32 stages 907+a third section of 32 stages 909. Each of the first-third sections 905, 907, 909 is coupled to respective first-third multiplicities of multipliers 911, 915, 919, e.g., 16 multipliers, and these multipliers are coupled to respective first-third multiplicities of coefficients 913, 917, 921. As depicted the first ordered set or multiplicity of coefficients 913 is identical to the third ordered set or multiplicity of coefficients 921.

Collectively, the multiplicity of multipliers 911, 915, 919 is configured to first multiply each sample of a first portion of the multiplicity of samples (every other sample stored in section 905) by a corresponding first coefficient of a first multiplicity of coefficients 913 included with the first information to provide first partial correlations, second multiply each sample of a second portion of the multiplicity of samples (every other sample stored in section 909) by a corresponding second coefficient of a second multiplicity of coefficients 921 included with the second information to provide second partial correlations, and third multiply each sample of a third portion of the multiplicity of samples (every other sample stored in section 907) by a corresponding third coefficient of a third multiplicity of coefficients 917 included with each of the first information and the second information to provide third partial correlations, wherein the first multiply to provide the first partial correlations, the second multiply to provide the second partial correlations, and the third multiply to provide the third partial correlations occur whenever a new sample is loaded into the buffer. By observation the coefficients 917 and 913 collectively represent a symbol, i.e., $C_0$-$C_{31}$, for, e.g., symbol 0 and the coefficients 921 and 917 collectively represent another symbol, i.e., $C_{16}$-$C_{31}$+$C_0$-$C_{15}$, for, e.g., symbol 4 (symbol 0 circularly shifted by 16 places.

The first and third partial correlations are summed together by summer 923 to provide a correlation corresponding to symbol 0 while the second and third partial correlations are summed together by summer 925 to provide a correlation corresponding to symbol 4. More specifically, the first partial correlations are summed together by summer 927 and the third partial correlations are summed together by summer 929, while the second partial correlations are summed together by summer 933. The outputs from summers 927 and 929 are coupled to and summed together by summer 931 to provide a correlation corresponding to symbol 0. The outputs from summer 929 and 933 are summed together by summer 935 to provide a correlation corresponding to symbol 4. Thus FIG. 9 illustrates a summer that is configured to sum the first partial correlations and the third partial correlations to provide a first sum corresponding to a correlation of the multiplicity of samples and the first information (symbol 0) and to sum the second partial correlations and the third partial correlations to provide a second sum corresponding to a correlation of the multiplicity of samples and the second information (symbol 4), wherein the first sum and the second sum are provided whenever a new sample is loaded into the buffer. It is noted that the architecture of FIG. 9 may be readily extended to add additional correlators for additional symbols, e.g., symbol 2 and 6 in accordance with IEEE 802.15.4.

From a performance perspective various simulations have been performed. In a single phase detector, i.e., a data frame detector using a single correlator, with the number of peaks K selected as 4 and the correlation window W selected as 4 (see FIG. 6 617, 611 respectively), a false positive (detect when data frame is not present) might be expected once every 7 seconds. When two correlators that overlap by one half symbol are simulated using K=4, W=4, the 7 seconds becomes 380 seconds. With these two correlators and K=5 and W=4 or W=5, false positives occur less than 1 time in every 10,000 seconds according to simulation results.

It will be appreciated that the various methods and apparatus described and discussed above may be readily implemented in many processors executing appropriate software instructions or in hardware or some combination of each. The apparatus and methodologies discussed and described above with reference to FIG. 1-FIG. 9 can be advantageously utilized to implement a detector that is configured for detecting presence of a data frame and providing symbol synchronization. To briefly review, one or more embodiments of the detector include a first correlator configured to provide a first sequence of correlations between samples of data as received and first information, e.g., first symbol, that denotes the data frame; a second correlator configured to provide a second sequence of correlations between the samples of data as received and second information, e.g., second symbol, that denotes the data frame, wherein the second symbol includes a portion of the first symbol; and a decision function, coupled to the first correlator and the second correlator, that is configured to provide a presence indication when the data frame is present based on the first sequence of correlations and the second sequence of correlations.

In some embodiments the detector further includes one or more additional correlators configured to provide one or more additional sequences of correlations between the samples of data as received and one or more additional symbols that denote the data frame, wherein the one or more additional symbols include a portion of the first symbol. Note that the detectors and methods discussed above may be particularly advantageously utilized when the data frame is or corresponds to a data frame in a direct sequence spread spectrum (DSSS) system. In these situations the detector and corresponding first, second, etc. correlators would correspond to and be configured as first, second, etc. despreaders.

It will be appreciated by those of ordinary skill that the above described receiver and detector systems will also include a general purpose controller to generally control the receiver and detector system. For example this controller would normally control whether the receiver is operational, e.g., whether a receive slot is present or whether a check should be made and the frequency of the local oscillator vis-à-vis programming a synthesizer, etc. This controller has not been shown or described in order to minimize any risk of obscuring the principles and concepts according to the present invention.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A detector configured for detecting presence of a data frame, the detector comprising:
   a first correlator configured to provide a first plurality of correlations corresponding to similarity between data as received and first information that denotes the data frame;
   a second correlator configured to provide a second plurality of correlations corresponding to similarity between the data as received and second information that denotes the data frame, the second information including a portion of the first information; and
   decision logic coupled to the first correlator and the second correlator, the decision logic configured to provide an indication that the data frame is present where the indication is based on the first plurality of correlations and the second plurality of correlations.

2. The detector of claim 1 wherein the first correlator further comprises:
   a buffer with a multiplicity of stages configured to store a corresponding multiplicity of samples of the data as received;
   a multiplicity of multipliers configured to multiply individual samples of the multiplicity of samples by a corresponding portion of the first information to provide partial correlations; and
   a summer configured to sum the partial correlations to provide a sum corresponding to a correlation of the multiplicity of samples and at least a portion of the first information.

3. The detector of claim 1 wherein the second correlator further comprises:
   a buffer with a multiplicity of stages configured to store a corresponding multiplicity of samples of the data as received;
   a multiplicity of multipliers configured to multiply individual samples of the multiplicity of samples by a corresponding portion of the second information to provide partial correlations; and
   a summer configured to sum the partial correlations to provide a sum corresponding to a correlation of the multiplicity of samples and at least a portion of the second information.

4. The detector of claim 1 wherein the first correlator and the second correlator collectively further comprise:
- a first in first out (FIFO) buffer with a multiplicity of stages configured to store a corresponding multiplicity of samples of the data as received and to shift the samples whenever a new sample is loaded into the FIFO buffer;
- a multiplicity of multipliers configured to first multiply each sample of the multiplicity of samples by a corresponding first coefficient of a first multiplicity of coefficients included with the first information to provide first partial correlations and second multiply the each sample of the multiplicity of samples by a corresponding second coefficient of a second multiplicity of coefficients included with the second information to provide second partial correlations, wherein the first multiply to provide the first partial correlations and the second multiply to provide the second partial correlations occur whenever the new sample is loaded into the buffer; and
- a summer configured to sum the first partial correlations to provide a first sum corresponding to a correlation of the multiplicity of samples and the first multiplicity of coefficients and to sum the second partial correlations to provide a second sum corresponding to a correlation of the multiplicity of samples and the second multiplicity of coefficients, wherein the first sum and the second sum are provided whenever a new sample is loaded into the buffer.

5. The detector of claim 4 wherein the multiplicity of multipliers further comprises:
- a first group of multipliers configured to provide the first partial correlations; and
- a second group of multipliers configured to provide the second partial correlations; and
wherein the summer further comprises:
- a first summer configured to provide the first sum; and
- a second summer configured to provide the second sum.

6. The detector of claim 5 wherein:
- the first group of multipliers is coupled to the first multiplicity of coefficients and the second group of multipliers is coupled to the second multiplicity of coefficients, wherein the first information further comprises the first multiplicity of coefficients with the second multiplicity of coefficients appended thereto and the second information further comprises the second multiplicity of coefficients with the first multiplicity of coefficients appended thereto; and
- the first summer is configured to provide the first sum to a second FIFO buffer and a third summer and the second summer is configured to provide the second sum to a third FIFO buffer and a fourth summer, an output of the second FIFO buffer coupled to the fourth summer and an output of the third FIFO buffer coupled to the fourth summer, wherein the third summer is configured to provide the first plurality of correlations and the fourth summer is configured to provide the second plurality of correlations.

7. The detector of claim 1 wherein the first correlator and the second correlator collectively further comprise:
- a first in first out (MO) buffer with a multiplicity of stages configured to store a corresponding multiplicity of samples of the data as received and to shift the samples whenever a new sample is loaded into the FIFO buffer;
- a multiplicity of multipliers configured to first multiply each sample of a first portion of the multiplicity of samples by a corresponding first coefficient of a first multiplicity of coefficients included with the first information to provide first partial correlations, second multiply each sample of a second portion of the multiplicity of samples by a corresponding second coefficient of a second multiplicity of coefficients included with the second information to provide second partial correlations, and third multiply each sample of a third portion of the multiplicity of samples by a corresponding third coefficient of a third multiplicity of coefficients included with each of the first information and the second information to provide third partial correlations, wherein the first multiply to provide the first partial correlations, the second multiply to provide the second partial correlations, and the third multiply to provide the third partial correlations occur whenever the new sample is loaded into the buffer; and
- a summer configured to sum the first partial correlations and the third partial correlations to provide a first sum corresponding to a correlation of the multiplicity of samples and the first information and to sum the second partial correlations and the third partial correlations to provide a second sum corresponding to a correlation of the multiplicity of samples and the second information, wherein the first sum and the second sum are provided whenever a new sample is loaded into the buffer.

8. The detector of claim 1 wherein the decision logic further comprises a peak detector configured to find first correlation peaks from the first plurality of correlations that are separated by a predetermined time period and second correlation peaks from the second plurality of correlations that are separated by the predetermined time period.

9. The detector of claim 8 wherein the decision logic further comprises a comparator for determining whether any of the first correlation peaks and the second correlation peaks satisfy a threshold.

10. The detector of claim 8 wherein the decision logic further comprises a window function for determining whether the first correlation peaks and the second correlation peaks fall within a time window around the predetermined time period.

11. A method of detecting presence of a data frame in data samples as received, the method comprising:
- correlating, in a correlator, the data samples with a first ordered set of coefficients corresponding to a known symbol sequence over a plurality of symbol periods to provide a sequence of first correlations over each symbol period, the known symbol sequence associated with the data frame being present;
- correlating the data samples with a second ordered set of coefficients over a portion of the plurality of symbol periods to provide a sequence of second correlations over the each symbol period, the second ordered set of coefficients including a portion of the first ordered set of coefficients;
- selecting a strongest first correlation from the sequence of first correlations for each symbol period and a strongest second correlation from the sequence of second correlations for each symbol period; and
- determining whether the data frame is present based on the strongest first correlation with associated first location index and the strongest second correlation with associated second location index for each symbol period.

12. The method of claim 11 further comprising correlating the data samples with one or more additional ordered sets of coefficients over the portion of the plurality of symbol periods to provide one or more additional sequences of additional correlations over the each symbol period, the one or more additional ordered sets of coefficients including a portion of the first ordered set of coefficients.

13. The method of claim 11 wherein the correlating the data samples with a second ordered set of coefficients further comprises correlating the data samples with a second ordered set of coefficients where the second ordered set of coefficients comprises a later portion of the first ordered set of coefficients for a first symbol combined with an earlier portion of the first ordered set of coefficients for a second symbol.

14. The method of claim 11 wherein the correlating the data samples with a second ordered set of coefficients further comprises correlating the data samples with a second ordered set of coefficients where the second ordered set of coefficients comprises the first ordered set of coefficients as circularly shifted.

15. The method of claim 11 further comprising sequentially shifting the data samples through a first in first out (FIFO) buffer with a multiplicity of stages and wherein:
the correlating the data samples with a first ordered set of coefficients further comprises correlating data samples within the FIFO buffer with at least a portion of the first ordered set of coefficients to provide a first correlation corresponding to the sequence of first correlations; and
the correlating the data samples with a second ordered set of coefficients further comprises correlating the data samples within the FIFO buffer with at least a portion of the second ordered set of coefficients to provide a second correlation corresponding to the sequence of second correlations.

16. The method of claim 11 wherein the determining whether the data frame is present further comprises determining whether a magnitude of the strongest first correlation satisfies a threshold and whether a magnitude of the strongest second correlation satisfies a threshold for one or more of the each symbol period.

17. The method of claim 11 wherein the determining whether the data frame is present further comprises determining whether the timing between successive strongest first correlations and successive strongest second correlations is within a timing window about a symbol period.

18. The method of claim 17 wherein the determining whether the data frame is present further comprises counting the occurrences of successive strongest first correlations and successive strongest second correlations being within the timing window and deciding that the data frame is present when the number of occurrences satisfies a count threshold.

19. A detector configured for detecting presence of a data frame and providing symbol synchronization, the detector comprising:
a first correlator configured to provide a first sequence of correlations between samples of data as received and a first symbol that denotes the data frame;
a second correlator configured to provide a second sequence of correlations between the samples of data as received and a second symbol that denotes the data frame, wherein the second symbol includes a portion of the first symbol; and
a decision function, coupled to the first correlator and the second correlator, configured to provide a presence indication when the data frame is present based on the first sequence of correlations and the second sequence of correlations.

20. The detector of claim 19 further comprising one or more additional correlators configured to provide one or more additional sequences of correlations between the samples of data as received and one or more additional symbols that denote the data frame, wherein the one or more additional symbols include a portion of the first symbol.

21. The detector of claim 20 wherein the first and second correlators corresponds to first and second despreaders and the data frame further corresponds to a data frame in a direct sequence spread spectrum (DSSS) system.

* * * * *